United States Patent [19]

Papiernik et al.

[11] Patent Number: 4,906,908
[45] Date of Patent: Mar. 6, 1990

[54] METHOD FOR NUMERICAL POSITION CONTROL OF MOTOR-DRIVEN SHAFTS

[75] Inventors: Wolfgang Papiernik; Thomas Baer, both of Erlangen; Gerhard Kirchner, Hausen, all of Fed. Rep. of Germany

[73] Assignee: Siemens Aktiengesellschaft, Munich, Fed. Rep. of Germany

[21] Appl. No.: 248,557

[22] Filed: Sep. 23, 1988

[30] Foreign Application Priority Data

Sep. 28, 1987 [DE] Fed. Rep. of Germany ....... 3732632

[51] Int. Cl.$^4$ ............................................. H02P 5/00
[52] U.S. Cl. ........................................ 318/600; 318/85; 318/625; 318/618; 318/72; 364/474.29; 364/474.35
[58] Field of Search ................................. 318/34–85, 318/110–112, 102, 564–575, 600, 601, 602, 603, 615, 618, 621, 625, 632, 640, 592, 611, 610, 616, 655, 653, 681; 364/474.11, 474.12, 474.14, 474.29, 474.35, 474.3, 132; 901/9, 15, 20–24

[56] References Cited

U.S. PATENT DOCUMENTS

| | | | |
|---|---|---|---|
| 3,718,845 | 2/1973 | Bejach et al. | 318/85 X |
| 3,718,846 | 2/1973 | Bejach | 318/85 |
| 3,896,361 | 7/1975 | Inaba et al. | 318/618 X |
| 4,000,449 | 12/1976 | Gripp . | |
| 4,084,083 | 4/1978 | McNally et al. | 318/625 X |
| 4,087,731 | 5/1978 | Rhoades | 318/625 |
| 4,093,904 | 6/1978 | Burig et al. | 318/675 X |
| 4,174,237 | 11/1979 | Hemming et al. | 318/72 X |
| 4,390,821 | 6/1983 | Krampe et al. | 318/85 |
| 4,405,884 | 9/1983 | Weber | 318/85 |
| 4,446,408 | 5/1984 | Ebermann et al. | 318/600 |
| 4,496,883 | 1/1985 | Eastcott et al. | 318/85 X |
| 4,617,498 | 10/1986 | Ruppert | 318/85 |
| 4,656,577 | 4/1987 | Herman | 318/603 X |
| 4,661,032 | 4/1987 | Arai | 901/9 X |
| 4,695,776 | 9/1987 | Dishner et al. | 318/111 X |
| 4,695,960 | 9/1987 | Reimann et al. . | |
| 4,761,597 | 8/1988 | Sasaki et al. | 318/625 |

FOREIGN PATENT DOCUMENTS 0184036 11/1985 European Pat. Off. .
2585523 1/1987 France .

Primary Examiner—William M. Shoop, Jr.
Assistant Examiner—Paul Ip
Attorney, Agent, or Firm—Kenyon & Kenyon

[57] ABSTRACT

In a method for numerical position control of motor-driven shafts whose rotations are to be synchronous with one another under a certain transmission ratio a control loop is provided for each shaft. A speed setpoint, weighted with the corresponding transmission ratio, is applied as a position setpoint per unit of time simultaneously to the control loops of the respective shafts. If the actual speeds of the shafts differ from one another due to a disturbance within the controlled system, the difference between these actual speeds is used to readjust the speed and the position within the speed controlled section of one of the control loops. Overshoot of the position of a shaft, which might be caused by direct adding of the position setpoint onto the speed control loop is avoided by the fact that a control element produces a delay having the time response corresponding to a delay introduced by the respective control section for speed and adds this delay to the position setpoint prior to integration (14 to 17, 24 to 27).

6 Claims, 2 Drawing Sheets

METHOD FOR NUMERICAL POSITION CONTROL OF MOTOR-DRIVEN SHAFTS

BACKGROUND OF THE INVENTION

1. Field of the Invention

The present invention relates to a method for numerical position control of at least two shafts, each motor-driven In particular, the present invention relates to a method of control of at least two shafts in hobbing machines, with the position of each shaft being adjustable by an input of desired position values via a control loop associated with that shaft that includes a speed control section. There is at least one master shaft and at least one slave shaft with a given transmission ratio with respect to the master shaft and which is controllable synchronously with the rotation of the master shaft. Each shaft can be fitted with a workpiece or tool.

2. Related Art

For Various machining techniques, as for example in gearcutting by hobbing or in shaping by the generating process, it is necessary to move one machine shaft as a function of the movements of one or several other machine shafts. To this end different transmission ratios between the various shafts must be selectable.

Methods in which the rotary movements of motor-driven shafts can be regulated in a manner dependent on one another are referred to also as "electronic transmissions".

European Patent Application 0 184 036 A1 which corresponds to U.S. Pat. No. 4,695,960, discloses a numerical o control of an electronic transmission for machine tools for producing gears. According to the disclosure the movement of the workpiece is made to be dependent on at least one movement of the tool in such a way that a reference variable for a position control loop of the workpiece is derived from the actual position of the tool.

In the manufacture of high-precision parts, as is the case with the production of gears by hobbing methods, the s synchronism of the respective motor-driven shafts must meet stringent requirements. However, if, as in the above named European patent application, the desired reference variable for use in the position control loop of one shaft is derived only from the actual position of the tool, i.e. from the actual position of one of the other shafts, the tool shaft, this necessarily results in a certain lag of the first shaft relative to the tool shaft. The reason for this is that the first shaft receives its desired value only from the actual value of the tool shaft, i.e. only after a rotation of the tool shaft has been executed. While this lag can be minimized by appropriate measures, it can never be kept at zero because the system design introduces the lag.

SUMMARY OF THE INVENTION

The present invention is directed to a method of numerical control of an electronic transmission which avoids the system-related lag associated with known control systems.

According to the present invention, the problem of system-related lag is overcome by using identically structured and specifically adjusted control loops for each of the shafts involved. As a result the shafts have the same dynamic behavior. A position setpoint of a slave shaft results from the position setpoint of a respective master shaft weighted with a respective transmission ratio. A resultant actual speed of the respective master shaft is compared with the resultant actual speed of the respective slave shaft taking into consideration the respective transmission ratio. Where there is a difference between the resultant actual speeds of the slave shaft and the master shaft the speed of the respective slave shaft can be readjusted by providing an input signal of a corresponding speed setpoint to the control section for the speed of the slave shaft, via a state-compensating controller.

According to one embodiment of the present invention where there is a difference between the resultant actual speeds of the slave and master shafts, the speed controlled section of the respective slave shaft is readjusted by providing an input signal of a corresponding current setpoint via a state-compensating controller. By such a direct intervention in the control section for speed any delays which might otherwise result from the other control elements of the respective control loops can be reduced.

The respective control loops may be designed so that a speed setpoint of a shaft associated with a given control loop is the result of a summation of a position setpoint supplied as an input to the respective speed controlled section and a speed control difference. The latter signal is obtained by proportional amplification of a position control difference, which is determinable from the actual position of the respective shaft compared to a signal produced from the introducing a delay and subsequently integrating the position setpoint which is an input signal to the control loop. The delay of the position setpoint is simulated according to the transient response of the control section for speed. By the direct adding of the position setpoint onto the control section one achieves a motor which on the one hand has a start-up characteristic that is highly dynamic. On the other hand the loop avoids overshoot, i.e. going beyond the predetermined position, by the delay introduced to the position control difference, since it is adapted to the transient response of the control section for speed.

According to another embodiment of the present invention the position setpoint of a respective shaft can be determined from a presettable circumferential velocity of a workpiece or tool attached to the respective shaft, by multiplying that circumferential velocity by a reciprocal of the radius of the workpiece or tool using a proportional control element Thus, the velocity of the respective shaft can be adapted to varying radii, for instance in the case of conical workpieces, and a fixed relative velocity of the workpiece to the tool can be maintained.

Furthermore, if there is a mechanical transmission consisting of at least two gears between the driving shaft of each motor and the respective shaft driven by the motor, transmission tolerances can be taken into account by the fact that the tolerances of both gears are contained in a specific table via a measuring system compensation device. In consideration of the respective tolerance values the exact position of the shaft of the motor is determinable from the table for each presettable position of tool or workpiece shaft position. Imprecisions in the manufacture of gears, e.g. worm drives or spur gears, can be compensated for to a very large extent by this method.

DETAILED DESCRIPTION

Figure 1:
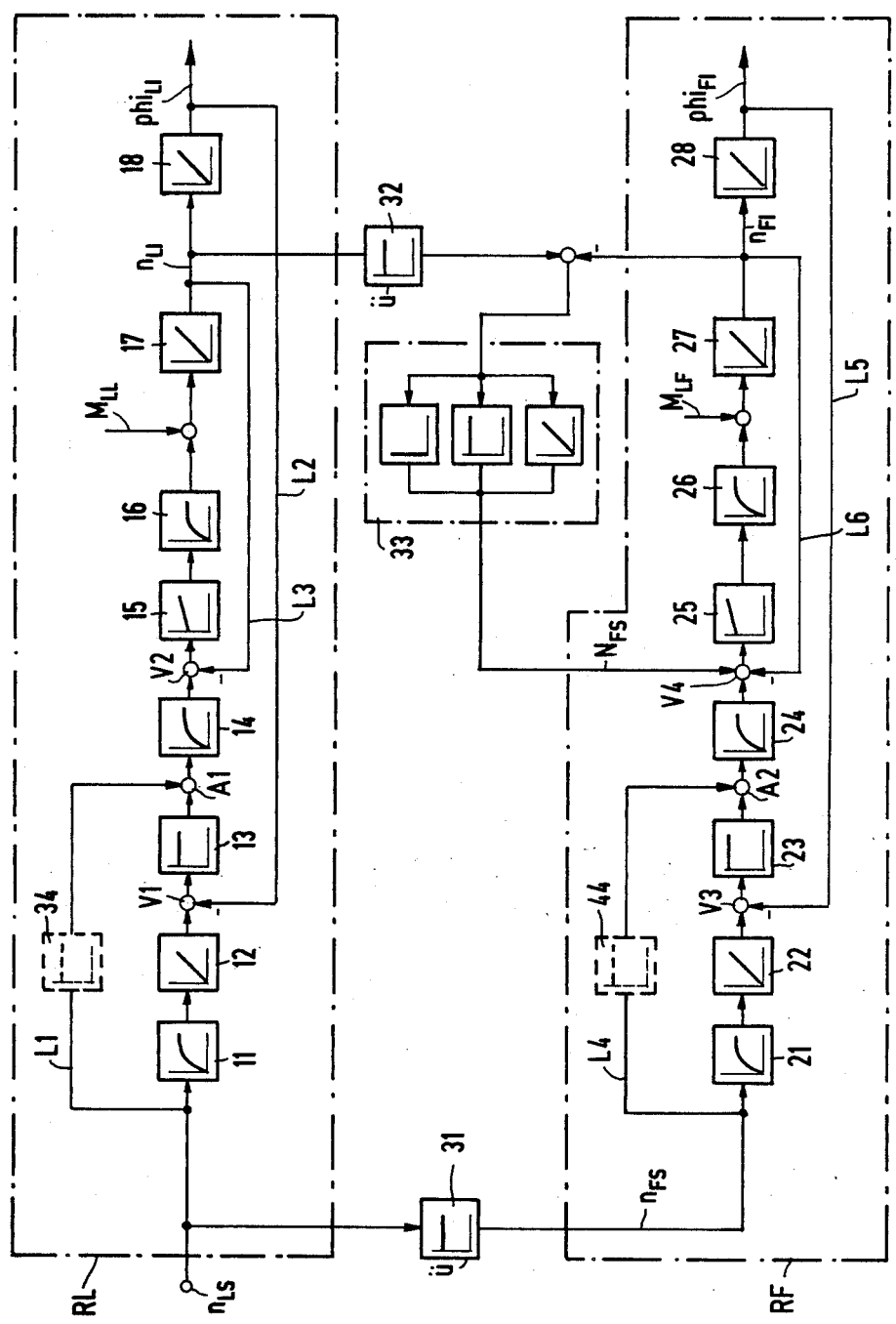
FIG. 1 illustrates a block diagram of an electronic transmission with a control loop for a master shaft and a control loop for a slave shaft according to one embodiment of the present invention.

FIG. 1 illustrates a block diagram of a control loop of an electronic transmission. The direction of the respective signal flow is indicated by arrows. To mark the dependence of the respective output signal on the input signal in terms of the effect of each of the block diagram elements, the respective transition function of each element is entered in each of the blocks of the signal flow chart.

The control loop for the entire system illustrated in FIG. 1 consists of a control loop RL for a master (lead) shaft and a control loop RF for a slave (follow) shaft, the two loops RL and RF (broken lines) are of identical design. An input $n_{LS}$ of the control loop of the master shaft, RL, is connected to the input $n_{FS}$ of the control loop of the slave shaft, RF via a proportional element 31 weighted with a factor "u". Also a corresponding proportional element 32 also weighted with a factor u and a state-compensating controller 33 connect $n_{LI}$ of the control loop of the master shaft RL to $N_{FS}$ of the slave shaft RF. Each of the two control loops RL, RF has a control section for speed including the control elements 14 to 17 for the master shaft, and control elements 24 to 27 for the slave shaft. The output of each of the control sections for speed is fed back to one of the comparators of the respective loop, V2 for loop RL and V4 for loop RF, via an action line L3, L6 respectively. The respective control sections for speed 14 to 17, and 24 to 27 form part of a position control loop for each loop RL or RF, Which is formed additionally with a proportional controller 13 in loop RL (23 in loop RF) along with an integrator 18 of loop RL (28 in loop RF). The respective actual position of the angle of the master shaft, $phi_{LI}$ or respective actual position of the angle of the slave shaft, $phi_{FI}$, is fed back to the comparator V1 of loop RL, V3 of loop RF via the actions line L2 and L5 respectively. In each loop RL and RF there is a series connection of a delay element 11 (loop RL), 21 (loop RF), and an integrator 12 (loop RL), 22 (loop RF) which precedes the position control portion of the loop. The delay elements 11, 21 may be for example a PT1 element. An action line L1 (loop RL), L4 (loop RF) bridges the chain structure of the control elements 11, 12 and 13 (loop RL) or 21, 22 and 23 (loop RF) respectively and leads to the adder A1 (loop RL), A2 (loop RF). The proportional elements 34 (loop RL), 44 (loop RF), illustrated with broken lines, in the action lines L1 loop RL) , L4 (loop RF) will be discussed later.

The individual controllers of the identically constructed control loops RL, RF of the master shaft as well as of the slave shaft are adjustable so that both control sections show the same dynamic behavior, i.e. the same transient times. In this connection it is expedient to go by the control section with the weakest motor.

The electronic transmission is given a speed setpoint for the master shaft in terms of a position setpoint per unit time $n_{LS}$, which means that per unit time, which is determined by a given clock cycle, the shaft is to rotate by a certain angle. If the clock period is for example one millisecond, and if a position setpoint of 45° is set, this represents one eighth revolution per millisecond or 7500 revolutions per minute.

The speed setpoint for the slave shaft $n_{FS}$ is produced by multiplying the speed setpoint for the master shaft, $n_{LS}$, by a certain presettable transmission factor "u" based on the transmission ratios of the master and slave shafts, which can be set by means of the proportional element 31. In this manner both control loops are given the desired speed setpoint $n_{LS}$ and $n_{FS}$ as a position setpoint per unit time at the same time. A synchronous rotation of the shafts, weighted with the given transmission ratio "u" is thus assured for equal dynamic behavior and for undisturbed operation of the two control loops RL, RF.

If, for example in a hobbing machine, a slave shaft is to be controlled as a function of several master shafts, the position setpoint of the slave shaft $n_{FS}$ can also be formed from the additive superposition of several or all position setpoints of the several master shafts. Naturally also in this practical case the respective position setpoints can be weighted with a transmission ratio "u" for each.

In case of a disturbance within the system, in particular in the speed controlled section which would result for example from a varying load moment of the master shaft $M_{LL}$ and/or from a varying load moment of the slave shaft $M_{LF}$ and would lead to asynchronous operation, in electronic transmissions the actual speed of the master shaft $n_{LI}$ and the actual speed of the slave shaft $n_{FI}$ are compared, the actual speed $n_{LI}$ being weighted before the comparison with the transmission ratio "u" given for the slave shaft via the proportional element 32.

In the case of a deviation of the actual speeds $n_{LI}$, $n_{FI}$ from each other caused by a disturbance, an appropriate speed setpoint $N_{FS}$, determined by the deviation, is applied via a state-compensating controller 33 (broken lines), which may be formed as a PID controller, to the control section for speed of the slave shaft, i.e. to the comparator V4. As a result, the speed of the slave shaft is readjusted and the difference between the actual values for speed $n_{LI}$, $n_{FI}$ and the actual values for position $phi_{LI}$, $phi_{FI}$ is thereby reduced to zero. In an alternative embodiment illustrated in FIG. 2 the state-compensating controller may instead present a current setpoint $I_{FS}$ also derived from the difference in actual speeds which could be applied directly to control element 26 rather than applying speed setpoint $N_{FS}$ to control element 25 through comparator V4.

Since according to the present invention identical control loops RL, RF are provided for each shaft, the operation of the control loop will be explained with reference to the control loop of the master shaft RL. The corresponding reference symbols of the control loop RF for the slave shaft are indicated in parentheses after the reference symbol of the control loop RL for the master shaft.

To obtain optimum transient response, the position setpoint per unit time $n_{LS}$ ($n_{FS}$) is supplied as a speed setpoint via the action line L1 (L4) to adder A1 (A2) and hence directly to the control section for speed, which consists of the control elements 14 to 17 (24 to 27). By this direct presetting of the speed the motor begins to start up, overcoming its inherent inertia. The inertia of the motor is such that the absolute actual position value which exists at the output of integrator 18 (28) and is fed back to the comparator V1 (V3) Via the action line L2 (L5) deviates strongly from the absolute position setpoint produced by the series connection of the delay element 11 (21) and the integrator 12 (22) acting on the position setpoint per unit time $n_{LS}$ ($n_{FS}$) which is also present at the comparator V1 (V3). As a result a high control difference results at the comparator V1 (V3) during the control cycles of the transient process and hence the reference input for the motor increases accordingly. Thereby, on the one hand, a very rapid startup of the motor is achieved, but on the other hand this type of control might lead to overshoot if there were no additional controls, which means that the shaft would rotate not just to the given absolute position setpoint, but a little beyond it. In the electronic transmission of the present invention overshoot is prevented by the control element 11 (21), which is a delay element that may be a PT1 element. The control element 11 can simulate a time response of the entire control section for speed 14 ... 17 (24 ... 27). The respective position setpoint per unit time $n_{LS}$ ($n_{FS}$) supplied to the integrator 12 (22) is transformed into an absolute position setpoint and transmitted to the comparator V1 (V3) having the delay that corresponds to the startup behavior of the motor.

Because this dynamic precontrol takes into consideration the startup behavior of the motor the position setpoint reaching the comparator V1 (V3) closely approximates to the actual position $phi_{LI}$ ($phi_{FI}$) fed back via the action line $L_2$ ($L_5$) and thus the control difference reaching the adder A1 (A2) as speed setpoint via the proportional controller 13 (23) is kept so small that overshoot is avoided.

The dynamic precontrol and hence the transient response of the entire control section can be optimized by a proportional controller 34 (44) indicated in broken lines in the action line L1 (L4). It has been found that with a proportional factor between 0.7 and 0.9 at the proportional controller 34 (44) a good transient response is obtainable if at the PT1 element 11 (21) the time response of the speed controlled section is simulated weighted with the factor 0.5.

In the steady state, the control element 11 (21) is inactive, and the speed setpoint is transferred to the integrator 12 (22) without delay.

Figure 2:
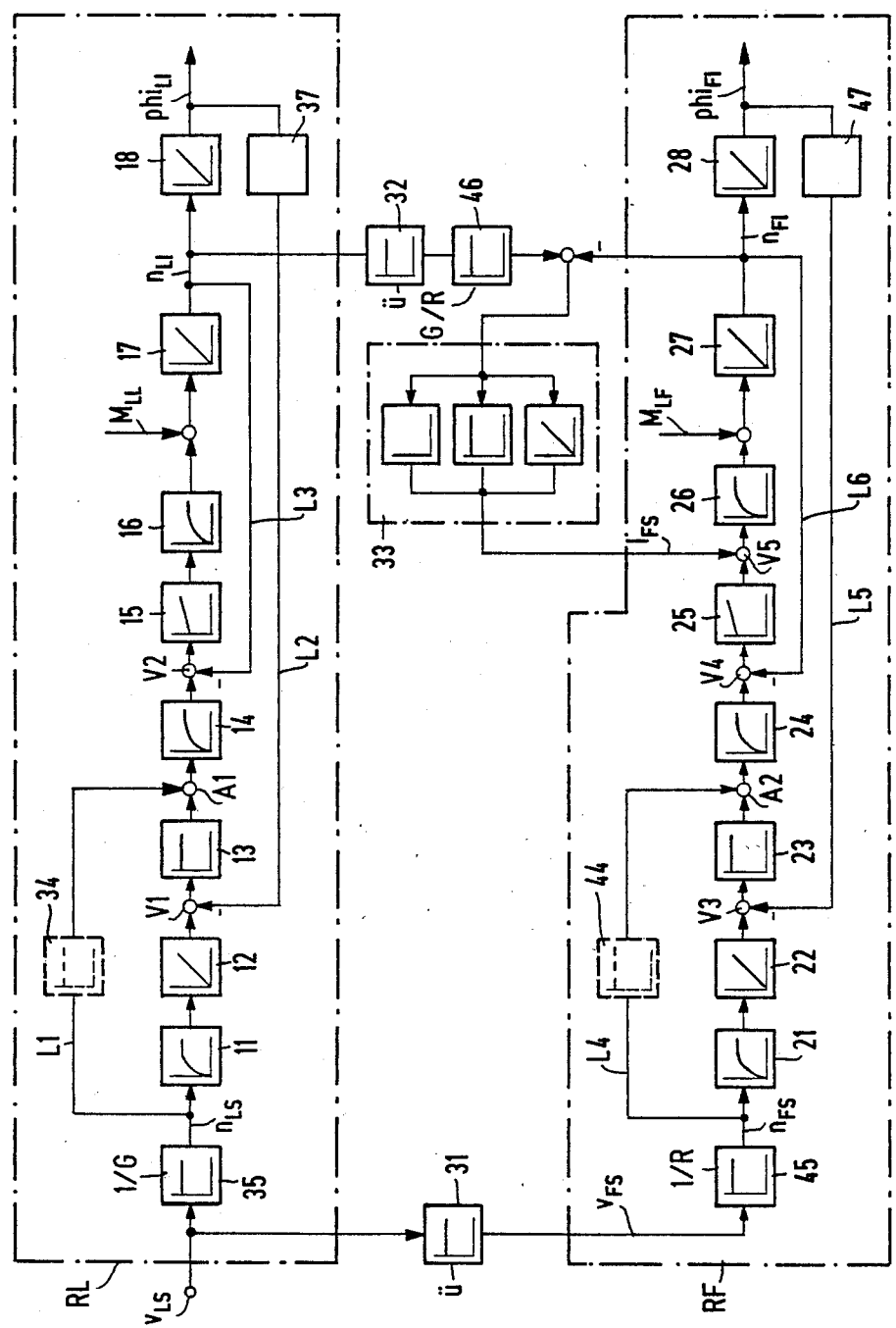
FIG. 2 illustrates an electronic transmission with a control loop for a master shaft and a control loop for a slave shaft according to another embodiment of the present invention.

FIG. 2 illustrates that an electronic transmission including the elements of the electronic transmission of FIG. 1 may be modified so that the control loop of the master shaft RL includes a proportional element 35 with a factor of 1/G whose input is a set speed $v_{LS}$ and whose output is the position setpoint per unit time $n_{LS}$. In addition, the control loop of the slave shaft RF includes a proportional controller 45 with a factor of 1/R having as an input a desired velocity $v_{FS}$ formed by the multiplication of the velocity $v_{LS}$ by the proportional element 35 and having as an output a desired position setpoint per unit time $n_{FS}$. Furthermore the feedback branches L2 and L5 of the two position control loops contain a measuring system compensation 37, 47. The factor 1/G in the control loop of the master shaft R1 and the factor 1/R in the slave shaft RF is taken in consideration in the comparison of the actual speeds $n_{LI}$, $n_{FI}$, by the proportional controller 46 with a factor G/R.

If, for example, a tool slide or carriage is to be driven linearly via the control loop RL of the master shaft, a set speed (velocity) $v_{LS}$ for this slide, instead of a rotational speed, can be supplied to the control loop RL of the master shaft. This velocity $v_{LS}$ is then multiplied by the proportional element 35 by the reciprocal of the spindle pitch 1/G of the spindle driving the slide, whereby the corresponding speed setpoint of position setpoint per unit time is obtained.

Also for the control loop of the slave shaft RF the presetting of a desired velocity $v_{FS}$ may be meaningful. If, for example, a conical workpiece is fastened on the slave shaft, and if this workpiece is to move at a constant circumferential velocity over the height of the cone, the velocity of the shaft must, for this purpose, be adjusted according to the varying cone radius. To this end, the desired circumferential velocity $v_{FS}$ can be supplied to the control loop of the slave shaft RF. The circumferential velocity $v_{FS}$ is continuously multiplied by the reciprocal 1/R of the respective workpiece radius in the proportional element 45. The multiplication factor is made available via a suitable measuring system, so that a corresponding speed setpoint is given to the actual speed controlled section. Naturally, this multiplication by the reciprocal 1/R of the respective workpiece radius (cone) and the spindle pitch G must be taken into consideration in the comparison of the actual speeds $n_{LI}$, $n_{FI}$, as it is represented in FIG. 2 by the proportional element 46 connected in series with proportional element 32. The output is supplied to the state compensating controller 33.

If for one or more shafts for example an especially slow speed is desired, it may happen that this speed cannot be attained by electronic control alone, so that a reducing gear is required. Such transmission gears involve manufacturing tolerances which must not be disregarded in view of the precision of today's machine tools. For the compensation of these manufacturing tolerances a measuring system compensation 37 (47) may be proVided in each control loop in the action line L2 (RL) and L3 (RF) between the integrator 18 (28) and comparator V1 (V3).

If, for example, the master shaft is speed-reduced by a transmission with a worm drive and a spur gear, there results for each position of the spur gear relative to each position of the worm gear a combination of the manufacturing tolerances of the individual gears, corresponding to the respective mutual position of the two gears, and hence an axial position differing from the intended position. If, for example, the position measurement is performed at the motor, the control loop can indeed have fulfilled its function, namely to compensate the difference between the actual position and the position setpoint. Yet, the actual axial position, i.e. the measured position of the shaft, may, because of the tolerances, differ from the intended position. To avoid this, the respective measuring system compensation 37, (47) is designed so that the tolerances of all gears over the circumference are set down in a table. In calculating the position, the measured position value of the respective shaft $phi_{LI}$($phi_{FI}$) is corrected first using the table of the motor gear tolerances and then with the table of the load gear tolerances (workpiece shaft, tool shaft) before it is supplied to the comparator V1 (V3).

What is claimed is:

1. A method for the numerical position and control of a system having a plurality of shafts including at least a motor driven master shaft and a motor driven slave shaft with a given transmission ratio with respect to said master shaft; each of said motor driven shafts having its own control loop comprising a predetermined structure with a control section for speed and each loop having means for adjusting transient times associated with that loop and further including a means for supplying input signals as speed setpoints as position setpoints per unit time the position of each shaft being adjustable in response to the said input signals comprising the steps of:
  (a) forming the predetermined structure of each of said control loops for each of said shafts from identical structure;
  (b) adjusting said means for adjusting of the control loops for each of said shafts to produce the same transient time for each shaft and associated loop;
  (c) generating a position setpoint for each respective slave shaft from a position setpoint of its respective master shaft by weighting said position setpoint of the respective master shaft with the respective transmission ratio;
  (d) comparing the resultant actual speed of each respective master shaft with the resultant actual speed of its associated slave shaft taking into consideration the transmission ratio therebetween;
  (e) readjusting the speed of the respective slave shaft if a difference between resultant actual speeds is determined, a state compensating controller providing an input to the control section for speed of the respective slave shaft to adjust the actual speed of the slave shaft.

2. The method of claim 1 wherein said input provided to the control section for speed by said state compensating controller comprises speed deviation setpoint.

3. The method of claim 1 wherein said input provided to the control section for speed by said state compensating controller comprises a current setpoint.

4. The method of claim 1 further comprising the following steps in each control loop;
  detecting the actual position of the respective shaft;
  adding a delay to said position setpoint per unit time provided by said means for supplying;
  integrating said delayed position setpoint per unit time to produce a position signal;
  comparing said actual position and said position signal to produce a position difference signal;
  differentiating said position difference signal;
  comparing said differentiated position difference signal to said position setpoint per unit time to produce a speed control difference signal;
  applying said speed control difference signal to said control section for speed.

5. THe method of claim 1 further comprising the step of:
  multiplying a settable circumferential velocity of a workpiece or tool fastened to the respective shaft by the reciprocal of a radius of the workpiece or tool fastened to the respective shaft by means of a proportional control element to obtain said position setpoint per unit time.

6. The method of claim 1 wherein a mechanical transmission consisting of at least two gears is present between the drive shaft of each motor and the respective shaft driven by the motor further comprising the steps of:
  establishing a separate table for the tolerances of both gears via a measuring system compensation device; and
  determining the exact position of the shaft of the motor relative to each settable tool or workpiece shaft position by considering the corresponding tolerance values in said respective separate tables.

* * * * *